United States Patent [19]
Warnecke

[11] Patent Number: 5,637,129
[45] Date of Patent: Jun. 10, 1997

[54] GLASS MELTING FURNACE PLUNGER NEEDLE SET-UP FIXTURE

[75] Inventor: Ronald P. Warnecke, Grand Rapids, Ohio

[73] Assignee: Owens-Brockway Glass Container Inc., Toledo, Ohio

[21] Appl. No.: 552,637

[22] Filed: Nov. 3, 1995

[51] Int. Cl.⁶ .......................... C03B 7/086; B25B 27/14
[52] U.S. Cl. .................... 65/362; 65/171; 65/328; 65/331; 65/375; 65/126; 65/129; 29/271
[58] Field of Search .......................... 65/171, 172, 173, 65/324, 325, 328, 330, 331, 362, 375, 27, 126, 129, 167, 323, 221; 29/270, 271; 81/488

[56] References Cited

U.S. PATENT DOCUMENTS

| | | | |
|---|---|---|---|
| 1,626,737 | 5/1927 | La France | 65/328 |
| 1,844,847 | 2/1932 | Good | 65/330 |
| 2,707,354 | 5/1955 | Peiler | 65/330 |
| 3,390,974 | 7/1968 | Parsons et al. | 65/323 |
| 3,582,309 | 6/1971 | Bracken | 65/328 |
| 3,711,266 | 1/1973 | Daly | 65/328 |
| 4,551,163 | 11/1985 | Duga et al. | 65/129 |
| 4,557,747 | 12/1985 | Boschi | 65/328 |
| 4,579,572 | 4/1986 | Duga et al. | 65/129 |
| 4,744,140 | 5/1988 | Bright | 29/271 |

*Primary Examiner*—Donald E. Czaja
*Assistant Examiner*—Steven P. Griffin

[57] ABSTRACT

A set-up fixture (50) for positioning the needle holders (18, 20, 22) of a molten glass feeder bowl with respect to one another, the fixture having a frame member (52) and a plurality of prongs (54, 56, 58) depending from the fixture, one prong for each of the needle holders of the feeder bowl installation. The prongs are inserted into apertures (24b, 26b, 28b) of base members (24, 26, 28) from which the needle holders are carried to accurately position support arms (30, 32, 34) to which the base members are affixed, and thus the needle holders and the plunger needles (12, 14, 16) carried thereby, with respect to one another. The prongs depend different distances from the frame member to permit sequential insertion of the prongs into the base member apertures.

5 Claims, 2 Drawing Sheets

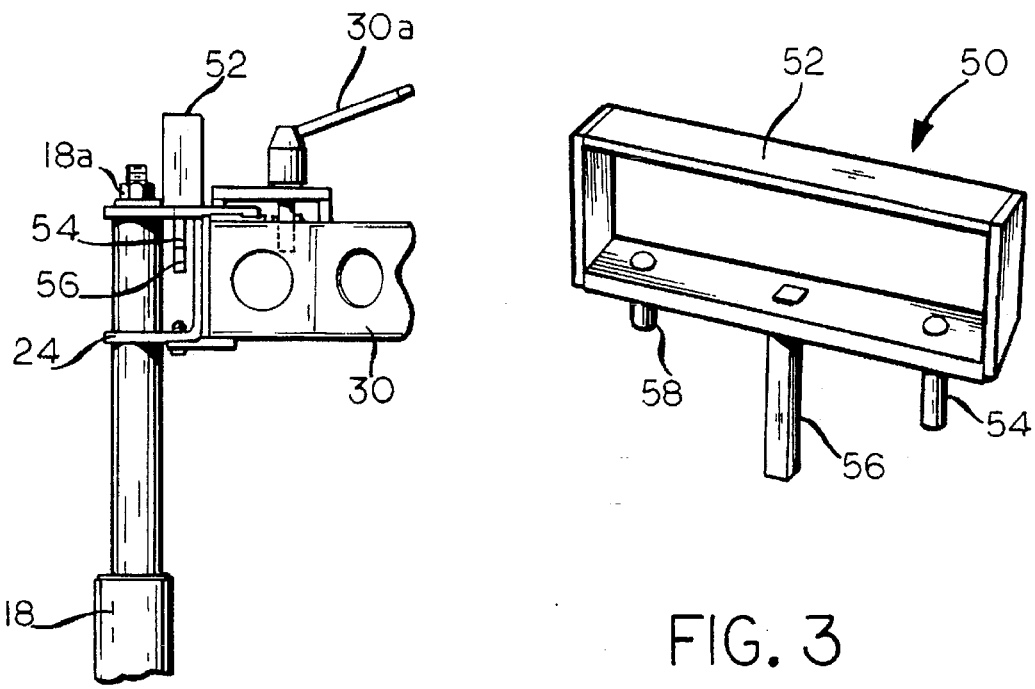
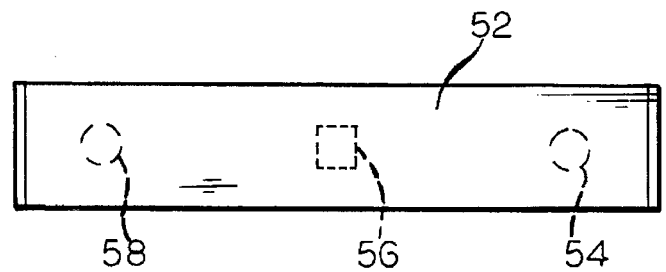
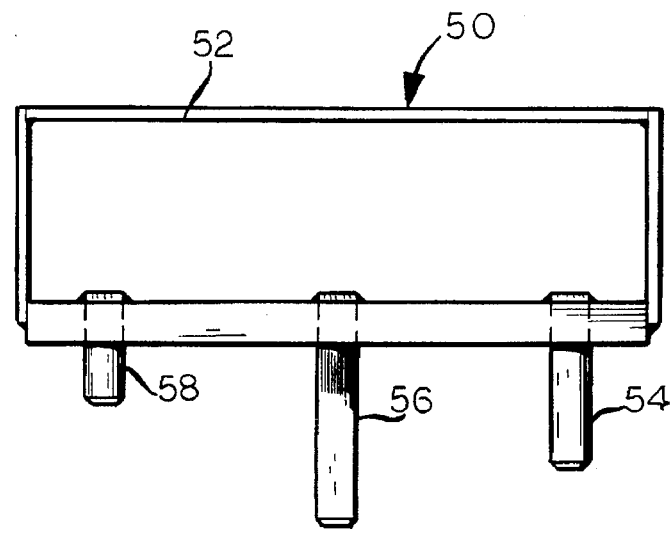

GLASS MELTING FURNACE PLUNGER NEEDLE SET-UP FIXTURE

FIELD OF THE INVENTION

This invention relates to a fixture for assisting in the precise positioning of a multiplicity of plunger needles in the feeder bowl of the forehearth of a glass melting furnace.

BACKGROUND OF THE INVENTION

In the manufacture of glass containers by a process that is often referred to as the flow process, molten glass flows through one or more orifices at the bottom of a feeder bowl, which is located at the outlet end of a molten glass conditioning forehearth, to a glass forming machine positioned beneath the feeder bowl. In modern glass container forming practice, the flow process is typically used to feed glass to a multiple cavity section of a forming machine of the individual section ("IS") type, and the feeder bowl is provided with the same number of orifices as the number of cavities in a section of the IS machine, for example, three orifices for a three section, or triple gob, IS machine.

The flow of glass through each orifice of a molten glass feeder bowl is controlled by an elongate, vertically extending ceramic plunger needle that is axially aligned with an orifice, the plunger needles being periodically reciprocated along their longitudinal central axes with respect to the orifices to deliver the glass at an intermittent flow rate to shears positioned between the feeder bowl and the forming machine. As a consequence of the function being performed by each needle, it must be very precisely axially aligned with the orifice beneath it, or precisely misaligned by a predetermined distance to balance orifice to orifice glass flow.

The precise alignment of needles with respect to feeder bowl orifices must be done frequently, as such needles are subject to relatively rapid wear in service and must be periodically replaced, for example, at intervals of approximately ten days. Presently, it is customary to install new needles in a molten glass feeder bowl "in the cold" that is, by inserting new needles in pre-set positions on a fixed plate after the feeder bowl has been drained of glass. If accurately positioned on the fixed plate, this technique will avoid the risk of dropping small hand tools into the molten glass in the feeder bowl, and discomfort to plant personnel in performing a task in an environment where ambient temperatures can be quite high. However, once the feeder bowl has been refilled with molten glass, any attempt to reset the position of any of the needles with respect to its outlet orifice, or to adjust the center to center spacing of any needle with respect to any other needle, does involve tedious tasks in a high temperature environment and the risk of dropping hand tools into the molten glass.

Certain problems associated with the alignment of a pair of plungers with their associated orifices of a feeder bowl of a glass forming installation are described in U.S. Pat. No. 4,579,572 (Duga et al.), the disclosure of which is incorporated by reference herein.

BRIEF DESCRIPTION OF THE INVENTION

According to the present invention there is provided a fixture for accurately positioning a plurality of needle holders of a glass melting furnace with respect to one another and, thus, with respect to the outlet orifices of the feeder bowl of the furnace with which each of the needles is to be associated. The fixture is made up of a fixed member with a plurality of prongs that depend from the fixed member. The prongs are adapted to be inserted into openings in a plurality of needle holder base plates, one for each of the needle holders, each base plate being mounted at the free end of a support arm. Each support arm is adjustable in position along its longitudinal central axis by an adjustment mechanism that is located at a distance away from the feeder bowl, and all of the support arms but one are also adjustable arcuately with respect to the one by an adjustment mechanism and about axes that are located away from the feeder bowl to adjust the center to center spacings between the needle holders. Thus, these adjustments can be made in an environment that is cooler than the environment immediately above the feeder bowl and without the risk that any hand tools used in making the adjustment, if inadvertently dropped, will fall into the molten glass in the feeder bowl. However, it is still necessary after the making of such adjustments to finally verify the accuracy of the center to center spacings between the needle holders, and to make any further adjustments needed to bring such center to center spacings to predetermined amounts. The fixture of the present invention is used for such purpose.

The prongs of the fixture of this invention, which are equal in number to the number of needle holders used with the feeder bowl, depend from the fixed structure by distances that differ from each other. Each prong, then, is inserted in sequence into an opening in a base plate for one of the needle holders to accurately position the base plate and the support arm on which it is carried with respect to the fixture, and consequently the needle holder and needle carried by the base plate with respect to the feeder bowl orifice with which it is associated. By varying the lengths of the prongs, the base plates can be accurately positioned in sequence, beginning with the base plate aligned with the longest prong and continuing to the base plate aligned with the shortest prong, without interference between any prong and its associated base plate during the insertion of any other prong.

Accordingly, it is an object of the present invention to provide an fixture for use in accurately positioning the needles of a multiple needle glass feeder bowl with respect to one another while the feeder bowl is filled with glass, and without the risk of dropping small tools into the molten glass.

For a further understanding of the present invention and the objects thereof, attention is directed to the drawing and to the following brief description thereof, to the detailed description of the preferred embodiment and to the appended claims.

BRIEF DESCRIPTION OF THE DRAWING

FIG. 2 is a fragmentary elevational view of a portion of the plunger needle apparatus illustrated in FIG. 1;

FIG. 3 is a perspective view of a set-up fixture according to the preferred embodiment of the present invention;

FIG. 4 is a plan view of a set-up fixture of FIG. 3; and

FIG. 5 is an elevational view of the set-up fixture of FIGS. 3 and 4.

DETAILED DESCRIPTION OF THE PREFERRED EMBODIMENT

Figure 1:
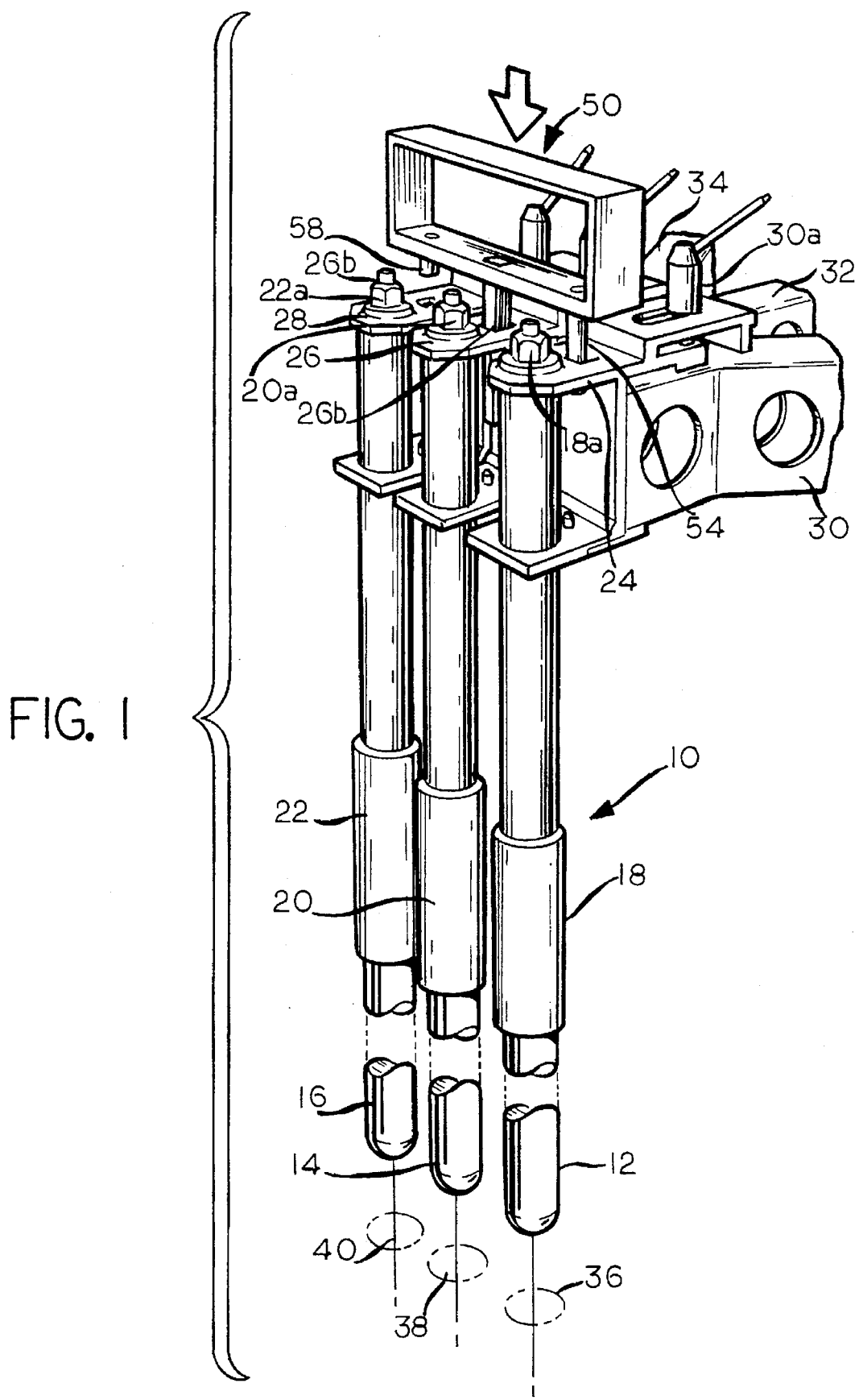
FIG. 1 is a fragmentary perspective view of a plunger needle assembly for a multiple orifice molten glass feeder bowl illustrating the use of the set-up fixture according to the preferred embodiment of the present invention.

A needle assembly for a glass feeder bowl is identified generally by reference numeral 10 in FIG. 1, and includes a plurality of elongate, vertically extending, ceramic plunger needles 12, 14, 16. The plunger needles 12, 14, 16 are held by needle holders 18, 20, 22, respectively, and this may be done in a manner that is known in the art. The needle holders 18, 20, 22, in turn, are suspended by needle holder base members 24, 26, 28, respectively, and the base members 24, 26, 28 are fixedly but removably secured to the free ends of generally horizontally extending support arms 30, 32, 34, respectively. Each of the support arms 30, 32, 34 is made up of a pair of end support arms and a center support arm. The support arms 30, 32, 34 are caused to reciprocate in a vertical plane in unison, in a manner that is known in the art, to bring the free ends of the needles 12, 14, 16 into and out of flow blocking positions with outlet orifices of a glass feeder bowl, shown schematically as outlets 36, 38, 40, respectively, in FIG. 1.

To permit accurate positioning of the longitudinal central axes of the needles 12, 14, 16 with respect to the axes of the feeder bowl outlets 36, 38, 40, respectively, the base members 24, 28 can be adjusted in position circumferentially in a horizontal plane with respect to the base member 26. To that end, the support arms 30, 34 are pivoted for adjustment about a vertical axis positioned away from the free ends to which the base members 24, 28 are attached, such support arms, as well as the support arm 32, being adjustable along their longitudinally central axes by adjustment mechanisms that are positioned away from the free ends to which the base members 24, 26, 28 are secured. The attachment of the base members 24, 26, 28 to the support arms 30, 32, 34, respectively, is releasable by providing an engagement member for each such base member, the engagement member 30a of the support arm 30 being representative of such engagement members. Thus, when the engagement member 30a is released, the base member 24 may be removed from the free end of the support arm 30 by which it is retained with respect to the support arm 30. It is also to be noted that it is important that the vertical positions of each of the needle holders 18, 20, 22 be vertically adjustable, and to that end the needle holders 18, 20, 22 are secured to the base members 24, 26, 28 by threaded connections 18a, 20a, 22a.

Proper center to center spacing of the needle holders 18, 22 with respect to that of the needle holder 20 is checked by the use of a fixture 50. The fixture 50 is made up of a frame member 52 and a plurality of depending prongs 54, 56, 58, one for each of the base members 24, 26, 28, that depend from the underside of the base member 52. The base members 24, 26, 28 are provided with prong receiving apertures, namely apertures 24b, 26b, 28b, respectively, to receive the prongs 54, 56, 58, respectively. As illustrated in FIGS. 3 and 5, the prongs 54, 56, 58 depend from the frame 50 for different distances to ensure that the prongs 54, 56, 58 will enter the apertures 24b, 26b, 28b, respectively, in sequence without interference between any prong and the base member it is aligned with. In that regard, the prong 56, which is intended to be inserted in the aperture 26b of the base member 26 that is to serve as a fixed base member with respect to the other base members, namely the base members 24, 28, is the longest of the prongs so that the other base members 24, 28 can then be adjusted in position relative to the base member 26.

After the base members 24, 28 are accurately positioned with respect to the base member 26 by adjusting the arcuate positions of the support arms 30, 34 and the longitudinal positions of the support arms 30, 32, 34 with the aid of the fixture 50, the support arms 30, 32, 34 are locked in position. Thereupon, the fixture 50 is removed, until it is again needed to reposition the base members 24, 28 with respect to the base member 26 and/or the longitudinal positions of the support arms 30, 32, 34.

The best mode known by the inventor(s) for carrying out the present invention as of the filing date hereof has been shown and described herein, and it will be apparent to those skilled in the art that suitable modifications, variations, and equivalents may be made without departing from the scope of the invention, such scope being limited solely by the terms of the following claims and the legal equivalents thereof.

What is claimed:

1. A plunger needle mechanism of a molten glass feeder bowl in combination with a set-up fixture for positioning a plurality of generally vertically extending plunger needles of said plunger needle mechanism with respect to one another, each plunger needle being carried by a needle holder, each needle holder being carried by a base member, each base member being mounted at the end of a support arm, at least one of the support arms being movable in a generally horizontal plane, each of the base members having a prong receiving aperture, said set-up fixture comprising:

a frame member; and, a plurality of prongs carried by said frame member and depending therefrom, each of said prongs being constructed and arranged so as to be received in said prong receiving aperture of a separate one of the base members.

2. A plunger needle mechanism of a molten glass feeder bowl in combination with a set-up fixture for positioning a plurality of generally vertically extending plunger needles of said plunger needle mechanism with respect to one another according to claim 1 wherein each of said prongs depends from said frame member for a different distance to permit said prongs to be inserted, in sequence, in the prong receiving apertures of the base members.

3. A plunger needle mechanism of a molten glass feeder bowl in combination with a set-up fixture for positioning three generally vertically extending needles of said plunger needle mechanism with respect to one another, each vertically extending needle being carried by a needle holder, each needle holder being carried by a base member, each base member being mounted at the end of a support arm, the support arms comprising a pair of end support arms and a center support arm, each of the end support arms being movable in a generally horizontal plane, each of the base members having a prong receiving aperture, said set-up fixture comprising:

a frame member; and, three prongs carried by said frame member and depending therefrom, each of said prongs being constructed and arranged so as to be received in said prong receiving aperture of a separate one of the base members.

4. A plunger needle mechanism of a molten glass feeder bowl in combination with a set-up fixture for positioning three generally vertically extending needles of said plunger needle mechanism with respect to one another according to claim 3 wherein said three prongs comprises a center prong and a pair of end prongs, each of said prongs depending from said frame member for a different distance to permit said prongs to be inserted, in sequence, in the prong receiving apertures of the base members.

5. A plunger needle mechanism of a molten glass feeder bowl in combination with a set-up fixture for positioning three generally vertically extending needles of said plunger needle mechanism with respect to one another according to claim 4 wherein said center prong depends further from said frame member than either of said end prongs, and wherein one of said end prongs depends further from said frame member than the other of said end prongs.

* * * * *